US011176322B2

(12) United States Patent
Catalano et al.

(10) Patent No.: US 11,176,322 B2
(45) Date of Patent: Nov. 16, 2021

(54) PREDICTING IF A MESSAGE WILL BE UNDERSTOOD BY RECIPIENTS

(71) Applicant: International Business Machines Corporation, Armonk, NY (US)

(72) Inventors: Pasquale A. Catalano, Wallkill, NY (US); John S. Werner, Fishkill, NY (US); Andrew G. Crimmins, Montrose, NY (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 15/985,972

(22) Filed: May 22, 2018

(65) Prior Publication Data

US 2019/0361974 A1 Nov. 28, 2019

(51) Int. Cl.
*G06F 40/253* (2020.01)
*G06F 40/263* (2020.01)
*G06F 40/205* (2020.01)
*G06F 40/284* (2020.01)

(52) U.S. Cl.
CPC .......... *G06F 40/253* (2020.01); *G06F 40/205* (2020.01); *G06F 40/263* (2020.01); *G06F 40/284* (2020.01)

(58) Field of Classification Search
CPC ......... G09B 7/00; G09B 19/00; G06F 17/277; G06F 17/2705; G06F 17/275; G06F 40/253; G06F 40/263
USPC .............. 704/9; 709/204; 715/261, 259; 705/7.39
See application file for complete search history.

(56) References Cited

U.S. PATENT DOCUMENTS

| 8,260,776 B2 * | 9/2012 | France-Prouvoste ........................ G06F 16/951 707/726 |
| 8,521,077 B2 * | 8/2013 | Venable .................. G09B 7/02 434/350 |
| 8,699,939 B2 * | 4/2014 | German ................. G06Q 10/10 434/350 |

(Continued)

OTHER PUBLICATIONS

Schwartz, "When email meets organizational memories: addressing threats to communication in a learning organization", Int. J. Human-Computer Studies (1999) 51, 599)614, Article No. ijhc.1999.0276 Available online at http:/www.idealibrary.com, 16pp.

*Primary Examiner* — Akwasi M Sarpong
(74) *Attorney, Agent, or Firm* — Cantor Colburn LLP; Teddi Maranzano

(57) ABSTRACT

A processor implemented method for evaluating a written communication in view of a proficiency of at least one recipient of the written communication is provided. The processor implemented method includes determining a proficiency profile of at least one user with respect to at least one knowledge area based on data sources read or created by the at least one user. The processor implemented method includes evaluating the written communication by identifying a proficiency of the written communication, comparing the proficiency of the written communication to the proficiency of the at least one recipient, and providing feedback to a creator of the written communication as to whether the at least one recipient understands the written communication.

20 Claims, 7 Drawing Sheets

(56) References Cited

U.S. PATENT DOCUMENTS

| | | | | |
|---|---|---|---|---|
| 8,725,059 B2* | 5/2014 | Lofthus | G06Q 10/10 |
| | | | 434/350 |
| 8,781,884 B2* | 7/2014 | O'Shea, Jr. | G06Q 10/105 |
| | | | 705/7.39 |
| 9,047,283 B1* | 6/2015 | Zhang | G06F 40/205 |
| 9,286,292 B2 | 3/2016 | Dixit et al. | |
| 2002/0194100 A1* | 12/2002 | Choban | G06Q 10/10 |
| | | | 705/36 R |
| 2004/0110119 A1* | 6/2004 | Riconda | G09B 7/02 |
| | | | 434/350 |
| 2004/0157201 A1* | 8/2004 | Hollingsworth | G09B 7/00 |
| | | | 434/350 |
| 2005/0086257 A1* | 4/2005 | Wright | G06Q 10/10 |
| 2005/0123891 A1* | 6/2005 | Bresciani | G09B 7/00 |
| | | | 434/322 |
| 2005/0283726 A1* | 12/2005 | Lunati | G06F 40/232 |
| | | | 715/257 |
| 2006/0005017 A1* | 1/2006 | Black | H04L 9/0891 |
| | | | 713/165 |
| 2006/0014129 A1* | 1/2006 | Coleman | G09B 7/02 |
| | | | 434/322 |
| 2006/0167992 A1* | 7/2006 | Cheung | G06F 40/169 |
| | | | 709/204 |
| 2008/0059152 A1* | 3/2008 | Fridman | G06F 40/247 |
| | | | 704/9 |
| 2010/0030551 A1 | 2/2010 | Ark et al. | |
| 2012/0196253 A1* | 8/2012 | Duvall | G09B 7/00 |
| | | | 434/156 |
| 2013/0096910 A1* | 4/2013 | Stan | G06F 40/30 |
| | | | 704/9 |
| 2013/0191738 A1* | 7/2013 | Bank | G06F 40/151 |
| | | | 715/259 |
| 2013/0309647 A1* | 11/2013 | Ford | G09B 7/02 |
| | | | 434/350 |
| 2014/0229476 A1* | 8/2014 | Fouad | G06F 16/3347 |
| | | | 707/729 |
| 2014/0272841 A1* | 9/2014 | Raniere | G09B 19/00 |
| | | | 434/236 |
| 2015/0254234 A1* | 9/2015 | Dixit | G06F 40/58 |
| | | | 704/2 |
| 2016/0103808 A1* | 4/2016 | Anders | G06F 40/166 |
| | | | 715/261 |
| 2017/0339091 A1 | 11/2017 | Astigarraga et al. | |

* cited by examiner

PREDICTING IF A MESSAGE WILL BE UNDERSTOOD BY RECIPIENTS

BACKGROUND

The disclosure relates generally to predicting if a message will be understood by recipients.

In general, when sending any form of written communication (e.g., an email, text message, etc.), contemporary technology is unable and/or not capable of predicting whether recipients will understand the written communication. Specifically, if a message contains industry specific terms or technical jargon, the contemporary technology has no way of identifying if a particular recipient is savvy enough to understand the industry specific terms or the technical jargon. For example, when a portion of any list of recipients may not understand the written communication and a sender may not know or be aware of this portion of the list of recipients, the contemporary technology is unable and/or not capable of informing the sender of this portion of the list of recipients.

SUMMARY

According to one or more embodiments, a processor implemented method for evaluating a written communication in view of a proficiency of at least one recipient of the written communication is provided. The processor implemented method includes determining, by a proficiency learning engine executable by a processor, a proficiency profile of at least one user with respect to at least one knowledge area based on data sources read or created by the at least one user. The processor implemented method includes evaluating, by a recipient understanding engine executable by the processor, the written communication by identifying a proficiency of the written communication, comparing the proficiency of the written communication to the proficiency of the at least one recipient, and providing feedback to a creator of the written communication as to whether the at least one recipient will understand the written communication. In accordance to one or more embodiments, the processor implemented method can be implemented as a system and/or computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
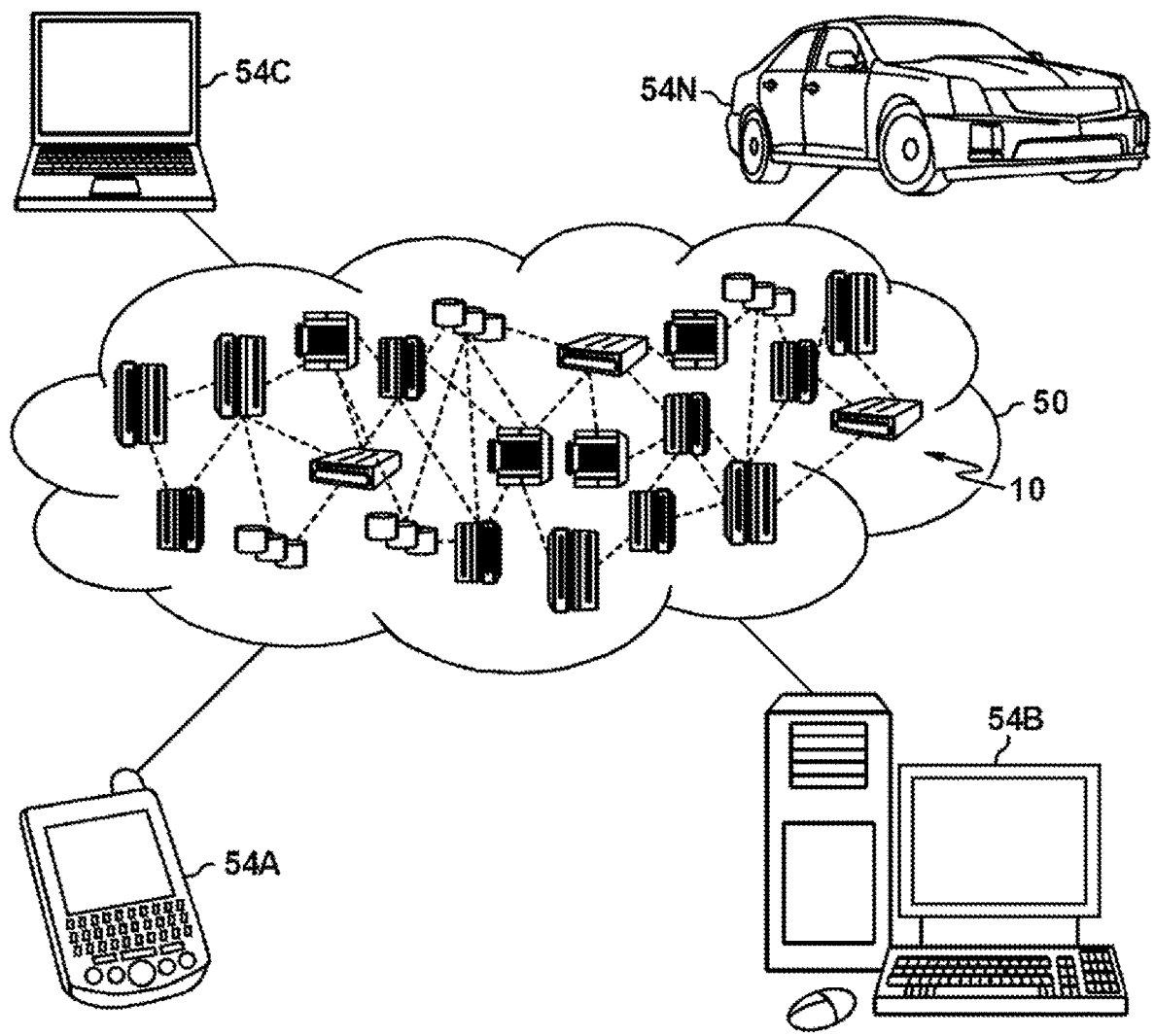
FIG. 1 depicts a cloud computing environment in accordance with one or more embodiments.

In view of the above, embodiments disclosed herein may include a system, method, and/or computer program product (herein the system) that provides natural language processing (NLP) to learn a proficiency or an understanding of users within a specific pillar of knowledge by determining and identifying text that the users have read and/or written. Once proficiency or understanding is learned for the users, the system evaluates a written communication intended to be sent to one or more recipients (e.g., select number of users), analyzes the written communication to understand the specific pillars of knowledge therein, and provides feedback to a creator/sender of the written communication as to whether the one or more recipients will have an understanding of the written communication. Technical effects and benefits include improved natural language processing and efficiency by the system. Thus, embodiments described herein are necessarily rooted in the system to perform proactive operations to overcome problems specifically arising in the realm of natural language processing for sending written communications. For example, while contemporary technologies have no way of identifying whether a particular recipient is savvy enough to understand industry specific terms or technical jargon, embodiments of the system herein can provide detailed analysis of any written communication.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
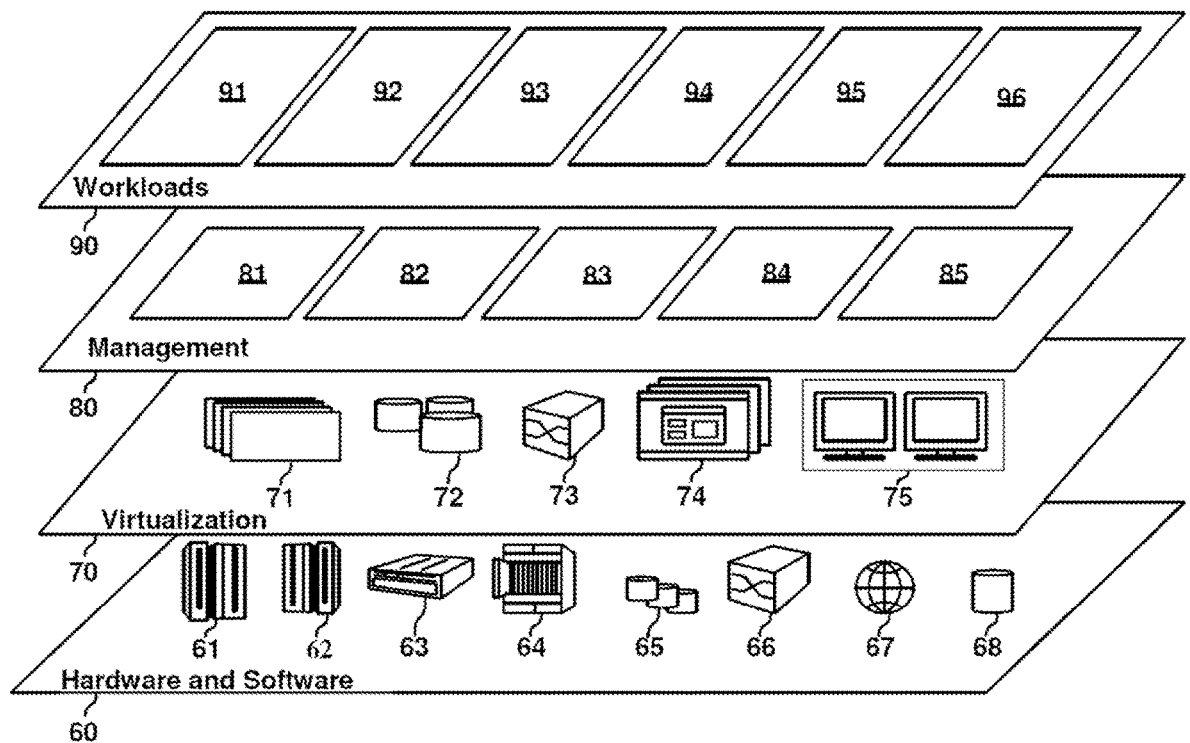
FIG. 2 depicts abstraction model layers in accordance with one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and proficiency learning and/or recipient understanding engine 96.

Figure 3:
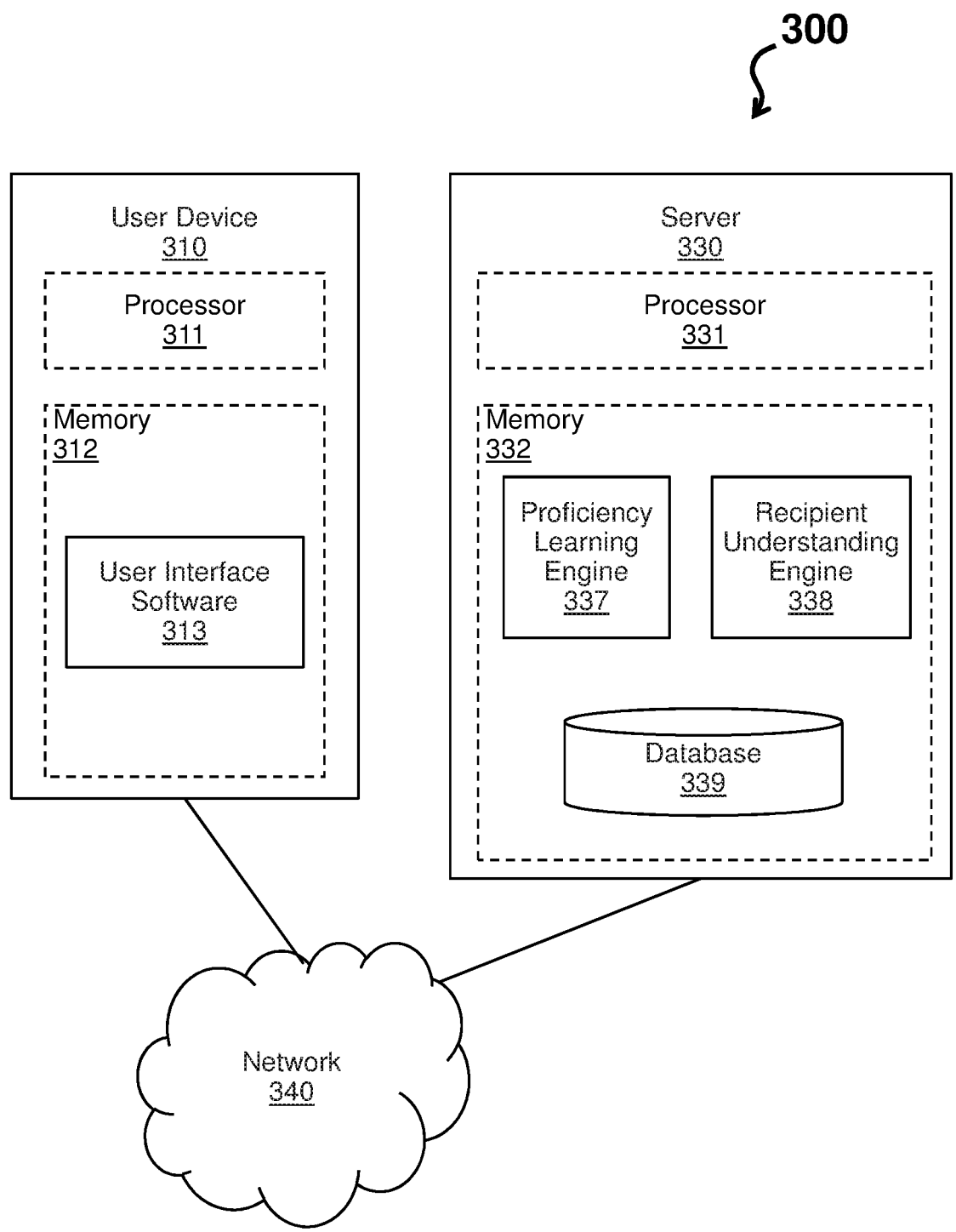
FIG. 3 depicts a communication schematic of a system in accordance with one or more embodiments.

Turning now to FIG. 3, a system 300 is generally shown in accordance with one or more embodiments. The system 300 can be an electronic, computer framework comprising and/or employing any number and combination of computing devices and networks utilizing various communication technologies, as described herein. The system 300 can be easily scalable, extensible, and modular, with the ability to change to different services or reconfigure some features independently of others.

The system 300 comprises a user device 310 including a processor 311 and a memory 312 with a user interface software 313 stored thereon. The system 300 comprises a server 330 including a processor 331 and a memory 332 with a proficiency learning engine 337, a recipient understanding engine 338, and a database 339 stored thereon. The system 300 comprises a network 340 through with the user device 310 and the server 330 can communicate.

The processors 311 and 331, also referred to as processing circuits, are respectively coupled via system buses to the memories 312 and 332 and various other components. The memories 312 and 332 are examples of a tangible storage medium readable by the processors 311 and 331. The memories 312 and 332 can include a read only memory (ROM) and a random access memory (RAM). The ROM is coupled to the system bus and may include a basic input/output system (BIOS), which controls certain basic functions of the user device 310 and/or the server 330. The RAM is read-write memory coupled to the system bus for use by the processors 311 and 331. The user device 310 and the server 330 can also comprise an input/output (I/O) and/or communications adapters coupled to the system buses therein. Further, the input/output (I/O) and/or communications adapters interconnect with the network 340, which may be an outside network, enabling the system 300 to communicate with other such systems.

Software for execution on the system 300 (i.e., by the processors 311 and 331) may be stored in the memories 312 and 332. For example, the user interface software 313, the proficiency learning engine 337, and the recipient understanding engine 338 are stored as instructions for execution by the processors 311 and 331 to cause the system 300 to operate, such as is described herein with reference to FIGS. 4-7, examples of a computer program product and the execution of such instruction are discussed herein in more detail.

As shown in FIG. 3, the user device 310 (e.g., a mobile device, a laptop, a desktop, etc.) enables user access to the user interface software 313. The user interface software 313 may be a standalone program and/or may run in a background of an application (e.g., a text message application, a social media application, etc.), a program (e.g., an email client, Lotus Notes, etc.), or in firmware allowing for an extraction and analysis of messages. The user interface software 313 further enables access to the server 330, via the network 340. The proficiency learning engine 337 builds a knowledge base establishing a user's proficiency in identified knowledge areas. The recipient understanding engine 338 utilizes the user's knowledge areas created by proficiency learning engine 337 to manage decisions on sending written communications to one or more recipients. The database 339 of the server 330 provides a repository for data (e.g., user profiles with the knowledge base) used by the proficiency learning engine 337 and the recipient understanding engine 338. Note that the user profiles may be stored in memory 312 on the user device 310 or in the database 339 of the server 330.

Figure 4:
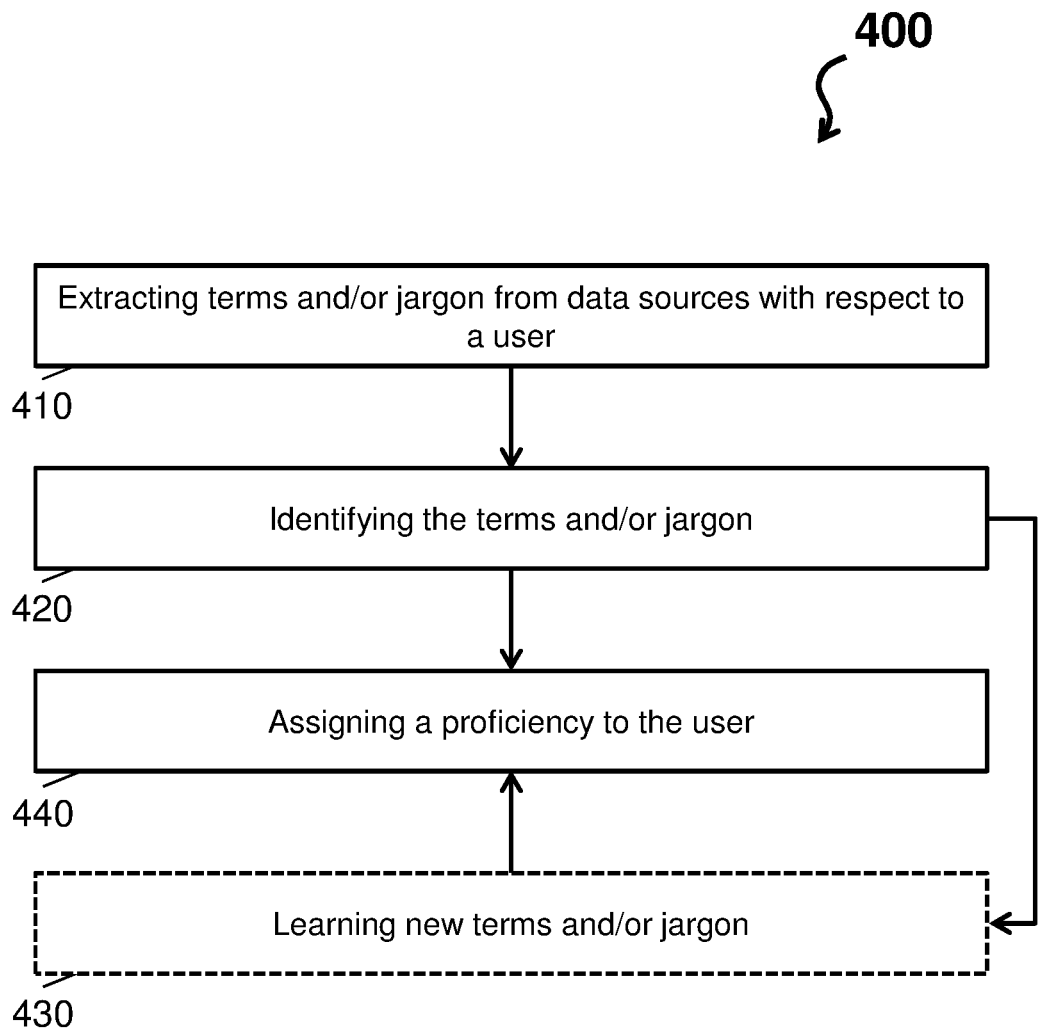
FIG. 4 depicts a process flow of a system in accordance with one or more embodiments.

FIG. 4 depicts a process flow 400 of the system 300 in accordance with one or more embodiments. The process flow 400 is an example operation of the proficiency learning engine 337 of the system 300 that builds a knowledge base establishing a user's proficiency in identified knowledge areas. The process flow 400 begins at block 410, where the system 300 extracts terms and/or jargon from data sources (e.g., social media posts, text messages, emails, etc.) with respect to a user. The terms and/or jargon include language used in a particular context or knowledge area (e.g., general topics) that may not be well understood outside of that knowledge area. The terms and/or jargon can further include special vocabulary including traits that can be distinguished from the rest of a language.

At block 420, the system 300 identifies the terms and/or jargon. Identifying the terms and/or jargon includes matching known terms and/or jargon of a user profile to the terms and/or jargon from the data sources. User profiles contain/link to additional data sources (e.g., social media posts, text messages, emails, etc.) that users have created and/or read. These additional data sources have previously provided the known terms and/or jargon to the user profile, which accumulates the knowledge base for the user per knowledge area and/or sub-knowledge area. Then, the process flow 400 proceeds to block 430 or directly to block 440.

At block 430, the system 300 learns new terms and/or jargon. Note that block 430 is dotted to illustrate its optionality for the process flow 400. If the system 300 determines that a portion of the terms and/or jargon from the data sources do not have a match within the user profile, the system 300 can determine the knowledge area of these new terms and/or jargon. The new terms and/or jargon and links to the data sources are then added to the user profile. Then, the process flow 400 proceeds to block 440.

At block 440, the system 300 assigns a proficiency to the user. For example, based on a determination that terms and/or jargon are either used properly when written by the user, on a determination that the user understood the word when reading (e.g., responded to a message that used an identified term), and/or how frequently the user reads or writes the identified term and/or jargon, a proficiency is assigned to the user. Correct use or understanding of the term and/or jargon may be based on learned data from a cognitive system that was trained using technical documents, textbooks, etc. in each pillar of knowledge. An example of the cognitive system is IBM Watson®'s Natural Language Understanding application programmable interface (API), Natural Language Classifier API, and/or Knowledge Studio API. The proficiency can be determined as a proficiency score on any scale. The proficiency score can be an alphanumeric character. Examples of the scale can include, but are not limited to, a scale from 1 to 10 with 1 being the least proficient and 10 being the most, or a scale from A to E with A being the most proficient and E being the least. Each user profile may have one or more proficiency scores, where each of the one or more proficiency scores is assigned to a particular knowledge area or sub-knowledge area. The compilation of the one or more proficiency scores and the particular knowledge area or sub-knowledge area can be considered a proficiency profile.

Figure 5:
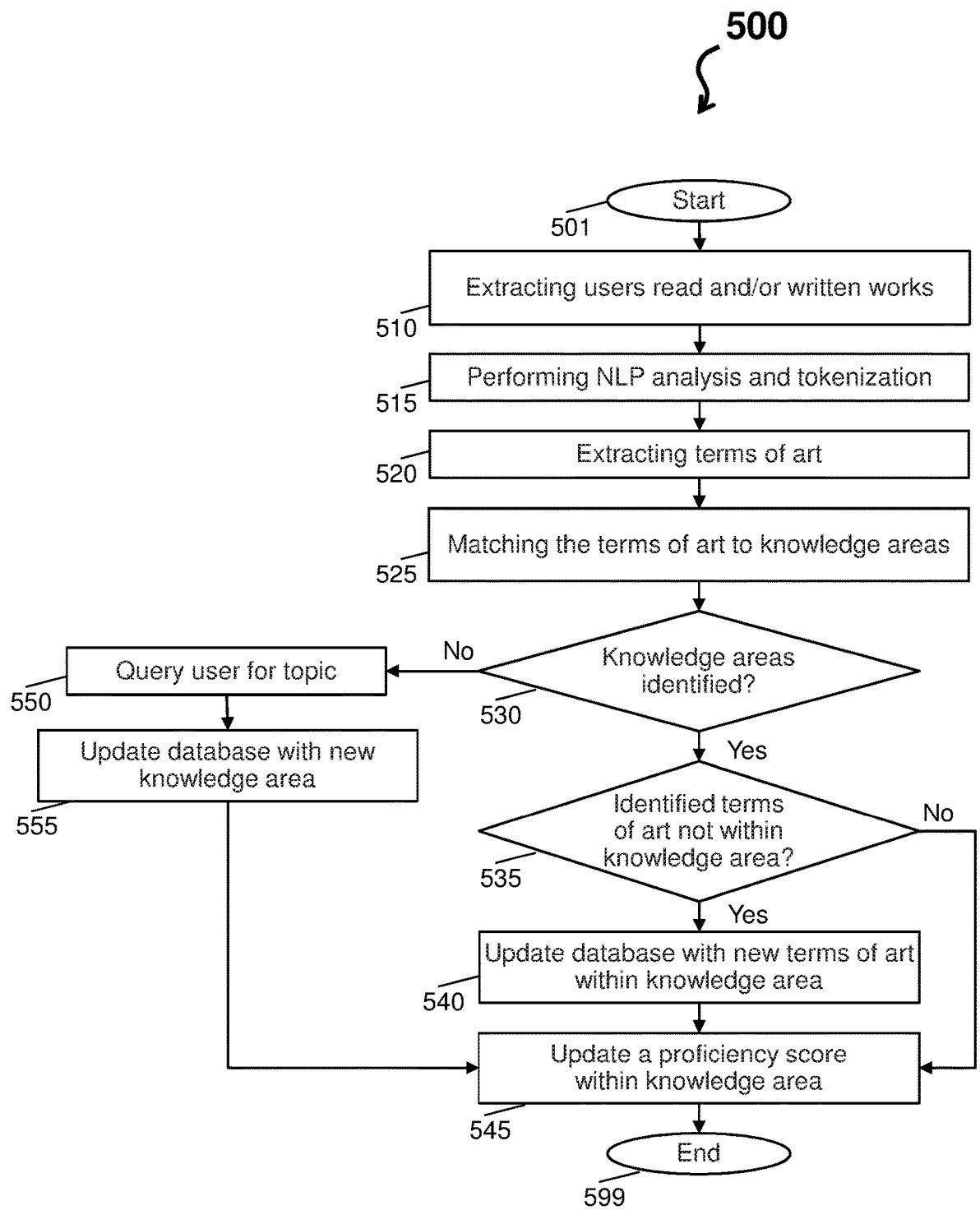
FIG. 5 depicts a process flow of a system in accordance with one or more embodiments.

Turning now to FIG. 5, a process flow 500 of the system 300 is depicted in accordance with one or more embodiments. The process flow 500 is an example operation of the proficiency learning engine 337 of the system 300 learning a user's knowledge area (e.g., builds a knowledge base establishing a user's proficiency in identified knowledge areas; determine, a proficiency profile of at least one user with respect to at least one knowledge area based on data sources read or created by the at least one user). The process flow 500 begins at start circle 501 and proceeds to block 510. At block 510, the proficiency learning engine 337 extracts users read and/or written works (data sources) to provide data. At block 515, using NLP, the proficiency learning engine 337 tokenizes and parses the data to search for terms of art. At block 520, the proficiency learning engine 337 extracts the terms of art. Example API's that can perform the NLP techniques of tokenization and be trained to extract terms of art are IBM Watson®'s Natural Language Understanding API, Natural Language Classifier API, and/or Knowledge Studio API. At block 525, the proficiency learning engine 337 matches the terms of art to knowledge areas.

The process flow 500 then proceeds to decision block 530, where the proficiency learning engine 337 determines if a knowledge area is identified. If at least one knowledge area is identified, then the process flow 500 proceeds to decision block 535 (as shown by the Yes arrow). At decision block 535, the proficiency learning engine 337 determines if any identified terms of art are not within at least one knowledge area specific to the user. If terms of art not within at least one knowledge area specific to the user are identified, then the process flow 500 proceeds to block 540 (as shown by the Yes arrow) where the proficiency learning engine 337 updates the user profile on database 339 with terms of art within the users knowledge area. If all terms of art within at least one knowledge area specific to the user, the process flow 500 proceeds to block 545 (as shown by the NO arrow). At block 545, the proficiency learning engine 337 updates a proficiency score within the identified knowledge area if it is determined that the user properly used and/or understood the identified terms. The process flow 500 concludes at end circle 599.

Returning to decision block 530, if no knowledge areas are identified, then the process flow 500 proceeds to block 550 (as shown by the NO arrow). At block 550, the proficiency learning engine 337 queries the user for a topic (knowledge area and/or sub-knowledge area). At block 555, the proficiency learning engine 337 updates the database (e.g., the user profile at its storage location) with the new knowledge area such that the cognitive system (e.g., IBM Watson®'s Natural Language Understanding API) can apply this knowledge to all users of the system in the future. The process flow 500 then proceeds to decision block 545 as indicated herein. The process flow 500 concludes at end circle 599.

Figure 6:
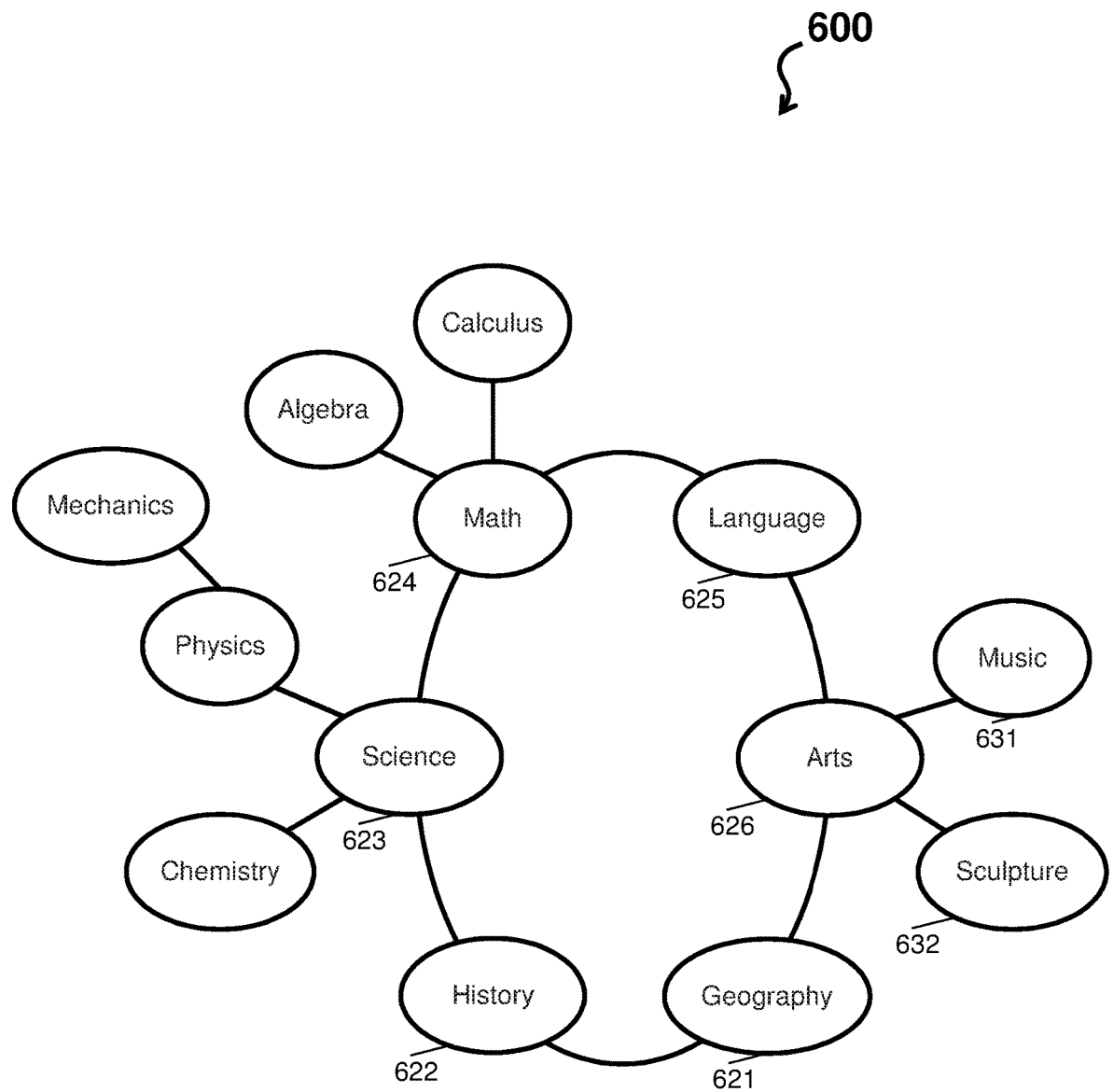
FIG. 6 depicts a dependency diagram of a proficiency learning engine in accordance with one or more embodiments.

FIG. 6 depicts a dependency diagram 600 of the proficiency learning engine 337 in accordance with one or more embodiments. The dependency diagram 600 details example knowledge areas 621-626 that can be utilized and uploaded to the system 300 (e.g., the database 339) and continuously updated over time. Each of the example knowledge areas 621-626 may contain further sub-knowledge areas 631-632. A sub-knowledge area can continue to go to deeper levels than what is shown. Knowledge areas and/or sub-knowledge areas are general topics, such as a particular occupation, a certain trade, a profession, an academic field, a company specific topic, a company specific project, etc. In accordance with one or more embodiments, the proficiency learning engine 337 can update knowledge area and/or terms of art through analytics of textbooks, white papers, literature, etc.

An example of assigning knowledge areas of the dependency diagram 600: if a document references Newton's second law of motion, the knowledge area may be Science 623. Physics and Mechanics may further be identified as sub-knowledge areas. In accordance with one or more embodiments, for each term identified, the proficiency score of the user in that knowledge area as well as all sub-knowledge areas in that branch may change proportionally.

An example of assigning knowledge areas of the dependency diagram 600: exacted terms of art may be tracked. If a document references Newton's second law of motion with reference to variable-mass systems, the proficiency score of the user may impact a chain, such as Science 623 to Physics to Mechanics to Newton's Laws of Motion to Newton's Second Law to Variable-Mass Systems.

Figure 7:
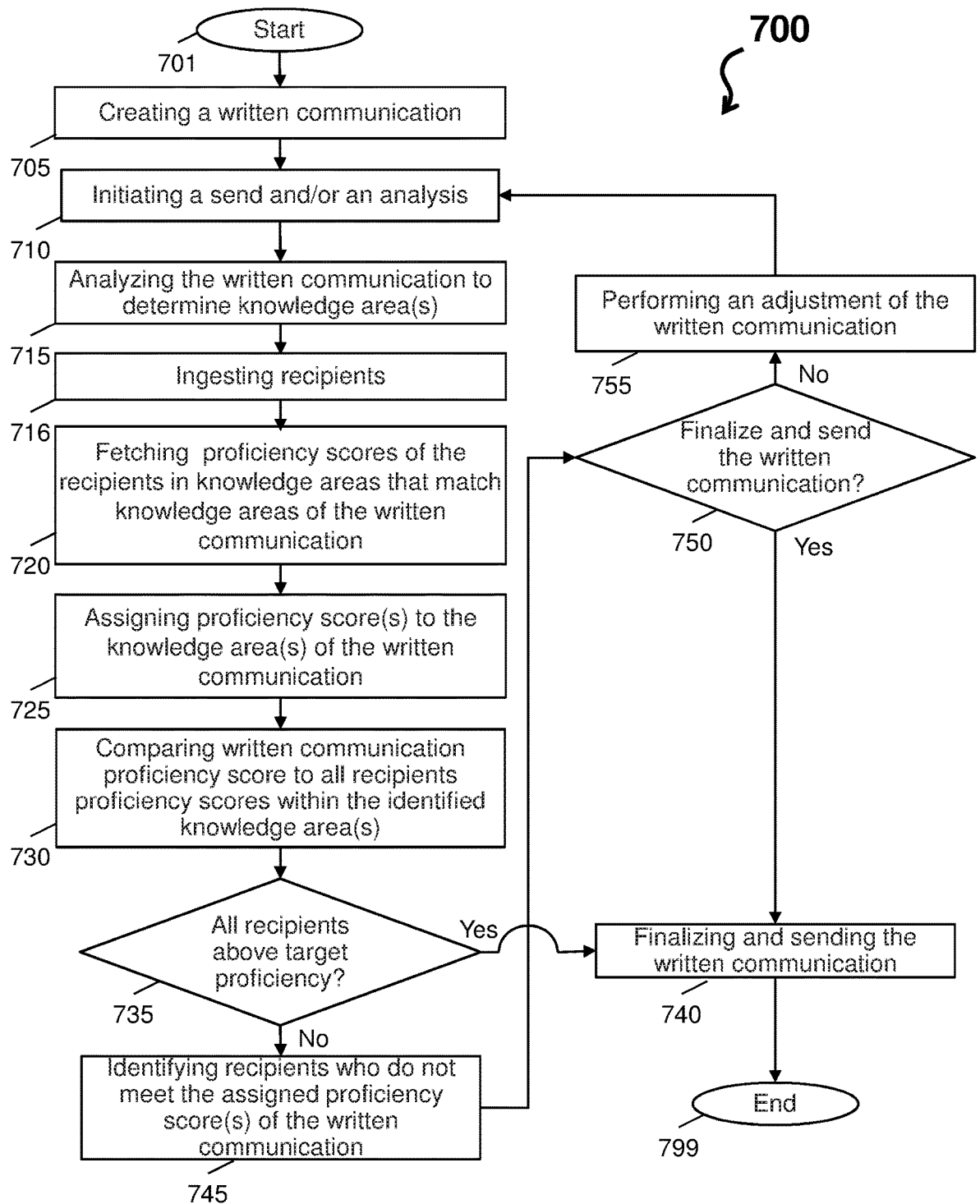
FIG. 7 depicts a process flow of a system in accordance with one or more embodiments.

FIG. 7 depicts a process flow 700 of the system 300 in accordance with one or more embodiments. The process flow 700 is an example operation of the recipient understanding engine 338 of the system 300 utilizing the message recipient's knowledge areas created by the proficiency learning engine 337 (e.g., evaluating the written communication by identifying a proficiency of the written communication, comparing the proficiency of the written communication to the proficiency of at least one recipient, and providing feedback to a creator of the written communication as to whether the at least one recipient understands the written communication). The process flow 700 begins at start circle 701 and proceeds to block 705. At block 705, a written communication is created within the system 300. Further, at least one recipient is added to and/or included with the written communication. The written communication with the at least one recipient can be created via the user interface software 313 by a user. At block 710, a send and/or an analysis of the written communication is initiated within the system 300. The send and/or the analysis can be initiated via the user interface software 313 by the user who created the written communication in block 705.

At block 715, the recipient understanding engine 338 analyzes the written communication to determine knowledge area(s) of the written communication. At block 716, the recipient understanding engine 338 ingests the at least one recipient. The recipient understanding engine 338 can ingest the at least one recipient in response to the initiation of the send and/or the analysis. By ingesting the at least one recipient, the recipient understanding engine 338 is identifying the targets of the written communication.

At block 720, the recipient understanding engine 338 fetches proficiency scores of the at least one recipient in knowledge areas that match knowledge areas of the written communication. For instance, the recipient understanding engine 338 fetches each knowledge area and corresponding proficiency score of the at least one recipient (e.g., their proficiency profile).

At block 725, the recipient understanding engine 338 assigns proficiency score(s) to the knowledge area(s) of the written communication. Further, the recipient understanding engine 338 can derive a target proficiency of the written communication based on the assigned proficiency score(s). At block 730, the recipient understanding engine 338 compares the written communication proficiency score to proficiency scores within the identified knowledge area(s) of the at least one recipient.

At decision block 735, the recipient understanding engine 338 determines whether the at least one recipient is above the target proficiency. In accordance with one or more embodiments, the scores can be equal to meet the condition of decision block 735. If the proficiency scores within the identified knowledge area(s) of the at least one recipient are above target proficiency, the process flow 700 proceeds to block 740 (as indicated by the Yes arrow). At block 740, the recipient understanding engine 338 finalizes and sends the written communication. The process flow 700 concludes at end circle 799.

Returning to decision block 735, if the proficiency scores within the identified knowledge area(s) of the at least one recipient are not above target proficiency, then the process flow 700 proceeds to block 745 (as indicated by the No arrow). At block 745, the recipient understanding engine 338 identifies recipients who do not meet the assigned proficiency score(s) of the written communication. At decision block 750, the recipient understanding engine 338 determines whether to finalize and send the written communication. This determination can be inputted via the user interface software 313 by the user who created the written communication in block 705. In accordance with one or more embodiments, the system 300 can provide a prompt or notification of which recipients may not understand the written message as well as the terms that those recipients may not understand. If at decision block 750 the recipient understanding engine 338 determines to finalize and send the written communication, then the process flow 700 proceeds to block 740 (as indicated by the Yes arrow). For example, the system 300 can provide the prompt indicating that a first recipient from upper level management that is on copy to an email may not understand some of the technical jargon in the email. A user can in turn decide to send the email anyway because the first recipient is on copy just for awareness and the technical jargon is important for other recipients of the email. At block 740, the recipient understanding engine 338 finalizes and sends the written communication. The process flow 700 concludes at end circle 799. If at decision block 750 the sender or recipient understanding engine 338 does not determine to finalize and send the written communication, then the process flow 700 proceeds to block 755 (as indicated by the No arrow). At block 755, the sender or recipient understanding engine 338 performs an adjustment of the written communication. The adjustment of the written communication can be automatic, where certain terms and/or jargon are replaced with synonyms. The adjustment of the written communication can be manual, where the user changes the written communication. If manual adjustment is performed, the system 300 can learn from the changes such that an automatic message adjustment method can be made and/or improved for future messages. After block 755, the process flow 700 proceeds to block 710.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor implemented method for evaluating a written communication in view of a proficiency of at least one recipient of the written communication, comprising:
    generating, by a proficiency learning engine executable by a processor, a proficiency profile of at least one user with respect to at least one knowledge area based on data sources read or created by the at least one user, the generating comprising:
        extracting and identifying terms or jargon from the data sources with respect to the at least one user, the identifying comprising matching known terms or jargon with the extracted terms or jargon, wherein the known terms or jargon were previously stored in the proficiency profile,
        determining a frequency of reading or writing the identified terms or jargon by the at least one user,
        determining whether the identified terms or jargon were used properly when written by the at least one user, and
    assigning a proficiency to the at least one user based at least in part on the frequency and on whether the identified terms or jargon were used properly when written by the at least one user;
    evaluating, by a recipient understanding engine executable by the processor, the written communication by:
        identifying a proficiency of the written communication;
        comparing the proficiency of the written communication to the proficiency of the at least one recipient; and
        providing feedback to a creator of the written communication as to whether the at least one recipient understands the written communication; and
    adjusting the written communication based on the feedback indicating that the at least one recipient does not understand the written communication, the adjusting comprising replacing an identified term or a jargon of the identified terms or jargon with a synonym, wherein the replacing is performed automatically in a future written communication to the recipient.

2. The method of claim 1, further comprising analyzing the written communication to determine at least one knowledge area of the creator of the written communication and identifying the proficiency of the creator of the written communication with respect to at least one knowledge area.

3. The method of claim 1, wherein the recipient understanding engine compares the proficiency of the written communication to the proficiency of the at least one recipient by determining whether the proficiency of the at least one recipient is above a target proficiency.

4. The method of claim 1, wherein the proficiency profile comprises a compilation of one or more proficiency scores associated with one or more knowledge areas or sub-knowledge areas.

5. The method of claim 1, wherein the at least one knowledge area comprises general topics related at least to an occupation, a trade, a profession, an academic field, a company specific topic, and a company specific project.

6. The method of claim 1, further comprising determining whether the identified terms or jargon were understood when read by the at least one user, wherein the assigning a proficiency is further based at least in part on whether the identified terms or jargon were understood when read by the at least one user.

7. The method of claim 1, wherein the proficiency of the at least one user comprises one or more proficiency scores, each of the one or more proficiency scores being assigned to a particular knowledge area or sub-knowledge area.

8. The method of claim 1, wherein the proficiency profile further stores links to additional data sources that at least a subset of the known terms or jargon were previously extracted from.

9. The method of claim 1, wherein the proficiency profile further additional data sources that at least a subset of the known terms or jargon were previously extracted from.

10. The method of claim 1, wherein the data sources include social media posts, text messages, and emails.

11. A computer program product for evaluating a written communication in view of a proficiency of at least one recipient of the written communication, the computer program product comprising a computer readable storage medium having program instructions embodied therewith, the program instructions executable by a processor to cause:
   generating, by a proficiency learning engine executable by the processor, a proficiency profile of at least one user with respect to at least one knowledge area based on data sources read or created by the at least one user, the generating comprising:
      extracting and identifying terms or jargon from the data sources with respect to the at least one user, the identifying comprising matching known terms or jargon with the extracted terms or jargon, wherein the known terms or jargon were previously stored in the proficiency profile,
      determining a frequency of reading or writing the identified terms or jargon by the at least one user,
      determining whether the identified terms or jargon were used properly when written by the at least one user, and
      assigning a proficiency to the at least one user based at least in part on the frequency and on whether the identified terms or jargon were used properly when written by the at least one user;
   evaluating, by a recipient understanding engine executable by the processor, the written communication by:
      identifying a proficiency of the written communication,
      comparing the proficiency of the written communication to the proficiency of the at least one recipient, and
      providing feedback to a creator of the written communication as to whether the at least one recipient understands the written communication; and
      adjusting the written communication based on the feedback indicating that the at least one recipient does not understand the written communication, the adjusting comprising replacing an identified term or a jargon of the identified terms or jargon with a synonym, wherein the replacing is performed automatically in a future written communication to the recipient.

12. The computer program product of claim 11, wherein the program instructions are further executable by the processor to analyze the written communication to determine at least one knowledge area of the creator of the written communication and identify the proficiency of the creator of the written communication with respect to at least one knowledge area.

13. The computer program product of claim 11, wherein the recipient understanding engine compares the proficiency of the written communication to the proficiency of the at least one recipient by determining whether the proficiency of the at least one recipient is above a target proficiency.

14. The computer program product of claim 11, wherein the proficiency profile comprises a compilation of one or more proficiency scores associated with one or more knowledge areas or sub-knowledge areas.

15. The computer program product of claim 11, wherein the at least one knowledge area comprises general topics related at least to an occupation, a trade, a profession, an academic field, a company specific topic, and a company specific project.

16. A system, comprising a processor and a memory storing program instructions for evaluating a written communication in view of a proficiency of at least one recipient of the written communication thereon, the program instructions executable by the processor to cause:
   generating, by a proficiency learning engine executable by the processor, a proficiency profile of at least one user with respect to at least one knowledge area based on data sources read or created by the at least one user, the generating comprising:
      extracting and identifying terms or jargon from data sources with respect to the at least one user,
      determining a frequency of reading or writing the identified terms or jargon by the at least one user, the identifying comprising matching known terms or jargon with the extracted terms or jargon, wherein the known terms or jargon were previously stored in the proficiency profile,
      determining whether the identified terms or jargon were used properly when written by the at least one user, and
   assigning a proficiency to the at least one user based at least in part on the frequency and on whether the identified terms or jargon were used properly when written by the at least one user; evaluating, by a recipient understanding engine executable by the processor, the written communication by:
      identifying a proficiency of the written communication,
      comparing the proficiency of the written communication to the proficiency of the at least one recipient, and
      providing feedback to a creator of the written communication as to whether the at least one recipient understands the written communication; and
      adjusting the written communication based on the feedback indicating that the at least one recipient does not understand the written communication, the adjusting comprising replacing an identified term or a jargon of the identified terms or jargon with a synonym, wherein the replacing is performed automatically in a future written communication to the recipient.

17. The system of claim 16, wherein the program instructions are further executable by the processor to analyze the written communication to determine at least one knowledge area of the creator of the written communication and identify the proficiency of the creator of the written communication with respect to the at least one knowledge area.

18. The system of claim 16, wherein the recipient understanding engine compares the proficiency of the written communication to the proficiency of the at least one recipient by determining whether the proficiency of the at least one recipient is above a target proficiency.

19. The system of claim 16, wherein the proficiency profile comprises a compilation of one or more proficiency scores associated with one or more knowledge areas or sub-knowledge areas.

20. The system of claim 16, wherein the at least one knowledge area comprises general topics related at least to an occupation, a trade, a profession, an academic field, a company specific topic, and a company specific project.

* * * * *